(12) United States Patent
Sumi

(10) Patent No.: US 8,393,366 B2
(45) Date of Patent: Mar. 12, 2013

(54) TREAD SIPE COMPRISING LOCKING PARTS

(75) Inventor: Ryo Sumi, Dublin, CA (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 807 days.

(21) Appl. No.: 12/281,747

(22) PCT Filed: Feb. 22, 2007

(86) PCT No.: PCT/EP2007/051724
§ 371 (c)(1),
(2), (4) Date: May 19, 2009

(87) PCT Pub. No.: WO2007/101794
PCT Pub. Date: Sep. 13, 2007

(65) Prior Publication Data
US 2009/0218020 A1  Sep. 3, 2009

(30) Foreign Application Priority Data
Mar. 8, 2006 (FR) ..................................... 06 02110

(51) Int. Cl.
*B29C 33/42* (2006.01)
*B60C 11/12* (2006.01)

(52) U.S. Cl. .......... 152/209.21; 152/209.23; 152/DIG. 3

(58) Field of Classification Search ............. 152/209.21, 152/209.23, DIG. 3; 425/28.1
See application file for complete search history.

(56) References Cited

U.S. PATENT DOCUMENTS

| | | | | |
|---|---|---|---|---|
| 5,918,654 A | * | 7/1999 | Bossut | ..................... 152/209.18 |
| 6,116,310 A | * | 9/2000 | Shinohara | ................ 152/DIG. 3 |
| 2003/0201048 A1 | * | 10/2003 | Radulescu et al. | ....... 152/209.18 |
| 2008/0029193 A1 | * | 2/2008 | Perrin et al. | ............. 152/209.18 |
| 2009/0223613 A1 | * | 9/2009 | Saeki | ....................... 152/209.18 |

FOREIGN PATENT DOCUMENTS

| | | | |
|---|---|---|---|
| DE | 4107547 A1 | * | 9/1991 |
| JP | 61-029507 A | * | 2/1986 |
| JP | 04-310408 A | * | 11/1992 |
| JP | 2000-102925 A | * | 4/2000 |
| JP | 2002-187412 A | | 7/2002 |
| JP | 2004-314758 A | | 11/2004 |
| WO | WO-2005/123420 A1 | * | 12/2005 |
| WO | WO-2006/013694 A1 | * | 2/2006 |
| WO | WO 2006/013694 A1 | | 2/2006 |

OTHER PUBLICATIONS

Machine translation for Japan 2000-102925 (no date).*
Machine translation for German 4,107,547 (no date).*
Derwent abstract for Japan 61-029507 (no date).*

* cited by examiner

*Primary Examiner* — Steven D Maki
(74) *Attorney, Agent, or Firm* — Buchanan Ingersoll & Rooney PC

(57) ABSTRACT

A tire tread comprising a plurality of sipes (30), each sipe being delimited by two opposing main walls (31, 32), each of the said walls consisting of a mean surface of which the intersection with the tread surface in the initial condition forms an edge, the mean width of each sipe measured as the mean distance between the edges formed by the opposing main walls (31, 32) of the said sipe on the tread surface in the initial condition is at least equal to 1.5 mm, each of the main walls (31, 32) comprising at least one locking region (310, 320), each locking region collaborating with a locking region opposite in such a way as to mechanically block relative movements of the said walls at least when the tire is in contact with the road surface.

9 Claims, 2 Drawing Sheets

Section on II-II

Section on III-III

TREAD SIPE COMPRISING LOCKING PARTS

The invention relates to a new geometry of sipe formed in a tread and to a molding element used to mould this type of sipe in an elastomeric material for a tread.

In order to increase the grip of a tire fitted to a passenger vehicle, particularly on ground covered with snow and/or with black ice, it is known practice for its tread (that is to say for that part of this tire that is intended to be in contact with the road surface during driving) to be provided with what, in the present description, will be termed generically cuts, these being obtained by molding during the operation of molding and curing the tire, or alternatively, being obtained after the said tire has been cured. Among cuts, there are sipes, that is to say spaces separating two faces of elastomer material, the width of these spaces usually being less than 3.0 millimeters (mm) in the case of passenger vehicle or heavy goods vehicle tires. This width may drop down as low as zero, that is to say that the opposing faces delimiting this space are in almost permanent contact.

Furthermore, among cuts, a distinction is drawn with grooves, which are spaces between two faces of elastomeric material and which have widths greater than or equal to 3 mm. The advantage of all these cuts is that they form edges of material which are active during contact with the road surface. Furthermore, the grooves are designed to remove more water whereas the sipes are designed to give a tread more grip through the possibility of having a greater number of edges on a given tread surface while at the same time maintaining satisfactory overall rigidity in terms of other performance aspects.

It has been found that the sipes may have a tendency to become filled with snow or ice particles during driving and that this, given the high number of sipes, makes these sipes less efficient because this filling-up to a greater or lesser extent somewhat erases the edges.

One solution to this problem is to use grooves that are wide enough that they can remove snow particles during driving, that is to say that have a width of at least 3 mm. The filling-up phenomenon is then less appreciable because the centrifugal force created as the tire rotates has the effect of throwing out the particles that fill the grooves. By contrast, these groove widths lead to a reduction in the rigidity of the tread pattern either in terms of squashing or under the effect of loads tangential to the area of contact between the tire and the road surface. Furthermore, the number of edges is thereby reduced for the same tread surface area given the relatively large width of the grooves used.

The problems that the invention is to solve can be stated as follows: how to obtain a tread pattern that has a great many sipes on its tread surface while at the same time limiting the reduction in rigidity and also being less sensitive to filling with snow or ice particles.

The tread according to the invention comprises a tread surface intended to be contact with the road surface when a tire provided with the said tread is driving along, this tread surface being provided with a tread pattern formed by a plurality of cuts, a plurality of these being sipes. Each sipe is delimited by two opposing main walls, each of the said walls consisting of a mean surface of which the intersection with the tread surface in the initial condition forms an edge. The mean width of each sipe measured as the mean distance between the edges formed by the opposing main walls of the said sipe on the tread surface in the initial condition is at least 1.5 mm.

Furthermore, each wall of these sipes comprises at least one region intended to collaborate with a region on the opposing other wall so as to reduce relative movements of the said walls with respect to one another by mechanically locking them together at least when the tire is in contact with the road surface. The percentage of the surface area occupied by these locking regions is at least 10% and at most 60% of the total surface area of each wall in the initial condition.

As a preference, this percentage is greater than 25% and less than 60%.

In the locking regions, the mean width of the sipe is suitable for the opposing wall parts in these regions to be in permanent contact with one another or to be in contact with one another during driving, at least when these sipes come into contact with the road surface. In these locking regions, the width of the sipe is at most 0.6 mm and more particularly still less than or equal to 0.1 mm.

To ensure that material filling the sipe is ejected, it is essential that these locking regions be formed within the tread, that is to say under the tread surface of the tread in the new condition so that it opens onto the said tread surface only when the said tread has become partially worn.

This choice of ranges of values is dictated by the minimum needed in order to have appreciable mechanical locking (the surface area is at least equal to 10%), and the maximum beyond which the percentage of wide sipe (at least equal to 1.5 mm) becomes insufficient to ensure ejection of any matter trapped in the sipe.

By virtue of the sipes according to the invention, the effectiveness of the edges is maintained even when snow and/or ice particles enter these sipes, because these particles can easily be ejected thanks to the relatively wide (at least 1.5 mm) width of the sipes near the tread surface in the new condition. A high level of mechanical rigidity of elements of the tread pattern provided with these sipes is afforded by the presence of the locking regions.

Furthermore, the sipe according to the invention may be extended with a widened part extending over the entire length of the sipe, this widened part having a width greater than the maximum width of the sipe. This widened part may be of any shape, and in particular may be circular or triangular (when viewed in cross section); it has a width at most equal to the mean width of the grooves of the tread and a height (measured in a direction perpendicular to the tread surface) at most equal to half the depth of the grooves in the tread in the new condition.

An improvement to the operation of the sipes is obtained by ensuring that the opposing walls make a non-zero mean angle α (alpha), the intersection of the said walls occurring on the inside of the tread (in which case the walls make an angle which diverges towards the tread surface). As a preference, the mean angle α (alpha) is between 4 degrees and 10 degrees. The mean angle means the angle made between the mean planes of the main walls that delimit a sipe.

As a preference, the opposing walls of these mechanical locking regions have geometries capable of mechanically locking one wall with respect to the other. One way of achieving this is to provide the walls of the narrow regions with recessed and raised reliefs that interact with one another. One embodiment is to form zigzag wall geometry in the thickness of the tread. It is also possible to zigzag in some other direction, in combination with or in isolation from the first zigzag.

Furthermore, a surface roughness may be created on all of the walls of the sipes. Advantageously, this roughness is created only on the locking regions. In this case, the presence of surface roughness limited only to the locking regions improves the mechanical locking still further while at the same time preventing snow and ice particles from becoming lodged in the other parts of the sipes.

Further features and advantages of the invention will become apparent from the description given hereinbelow with reference to the attached drawings which, by way of nonlimiting examples, show some embodiments of the subject matter of the invention.

DESCRIPTION OF THE PREFERRED EMBODIMENTS

Figure 1:
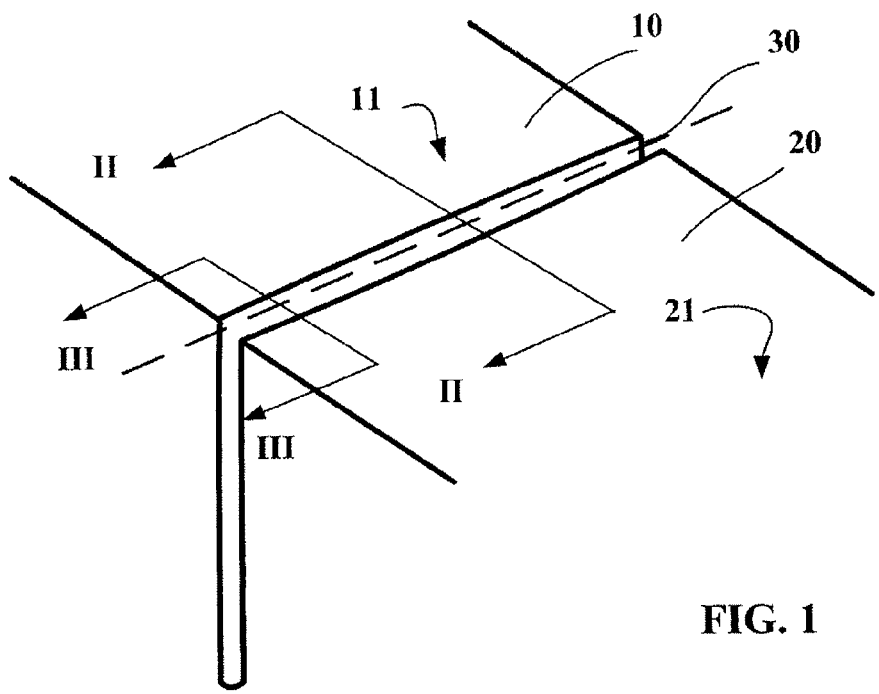
FIG. 1 shows a part view of a tread in the initial condition, this tread comprising a plurality of sipes according to the invention.

FIG. 1 shows a part view of a tire tread provided with a sipe according to the invention. In this FIG. 1, two rubber elements 10, 20 of a tread pattern are separated from one another by a sipe 30 the mean width of which is greater than 1.0 mm. These two elements of tread pattern 10, 20 have external surfaces 11, 21 intended to come into contact with the road surface during driving; these surfaces 11, 21 form parts of the tread surface of the tread.

Figure 2:
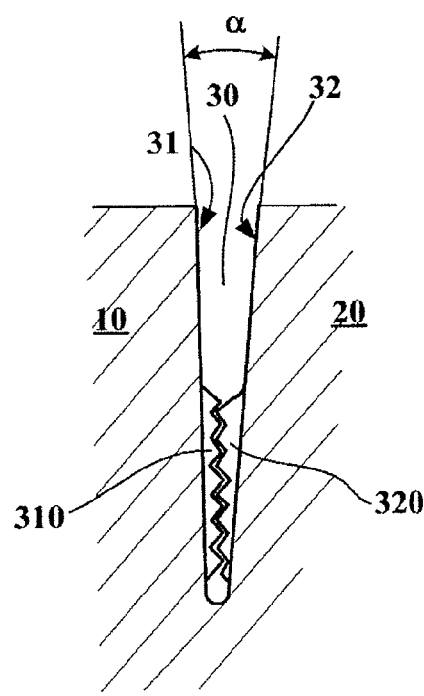
FIG. 2 shows a section through the sipe of FIG. 1 on section plane II-II, passing through a locking region.
Figure 3:
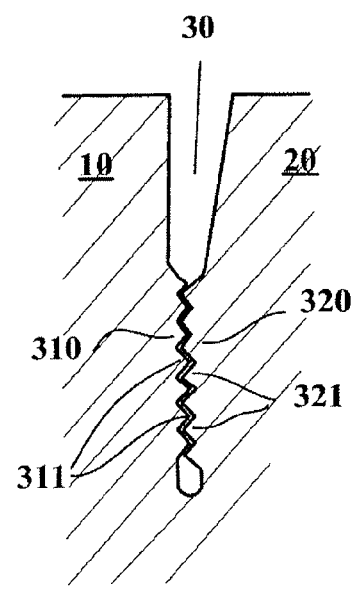
FIG. 3 shows a section through the sipe of FIG. 1 on section plane III-III, not passing through a locking region.

FIGS. 2 and 3 show sections through this tread taken on section plane II-II and III-III which are perpendicular to the tread surface and identified in FIG. 1.

FIG. 2 shows the line of the main walls 31, 32 of the sipe 30 in the plane of section, these walls 31, 32 forming between them an angle α (alpha) of 5 degrees, the virtual intersection of the said lines lying within the thickness of the tread. In the alternative form of embodiment depicted, the width of the sipe is 1.6 mm on the tread surface in the new condition and decreases uniformly through the thickness.

Furthermore, also visible on each wall 31, 32 is a protrusion 310, 320 that locally reduces the width of the sipe 30. FIG. 3 shows a cross section of the same sipe taken on a plane III-III and on each protrusion 310, 320. The combination of the protrusions 310, 320 forms a locking region that blocks relative movements of one main wall 31 with respect to the other wall 32 opposite. The locking means consists in the presence of a plurality of reliefs 311, 321 (recesses and raised portions) on a wall and the forming of a complementary part to interlock with the wall opposite in order locally to reduce the mean width to 0.6 mm or even less so as to allow mechanical collaboration through the interlocking of the relief patterns of one wall with those of the wall opposite.

In this instance, the sipe has just one locking region which occupies a surface area substantially equal to 30% of the total surface area of the main walls.

In order to ensure that the sipe works correctly it is preferable for the locking regions to be distributed more or less uniformly over the surface of the walls of the sipe (each locking region extending from near the tread surface in the initial condition down to the bottom of the sipe) and having a total surface area (that is to say a surface area equal to the sum of the surface areas of the locking regions) that represents between 10 and 60% of the total surface area.

As a preference, the minimum distance separating each locking region from the tread surface in the initial condition is at least 25% of the total depth of the sipe in which the said locking region is formed.

Figure 4A:
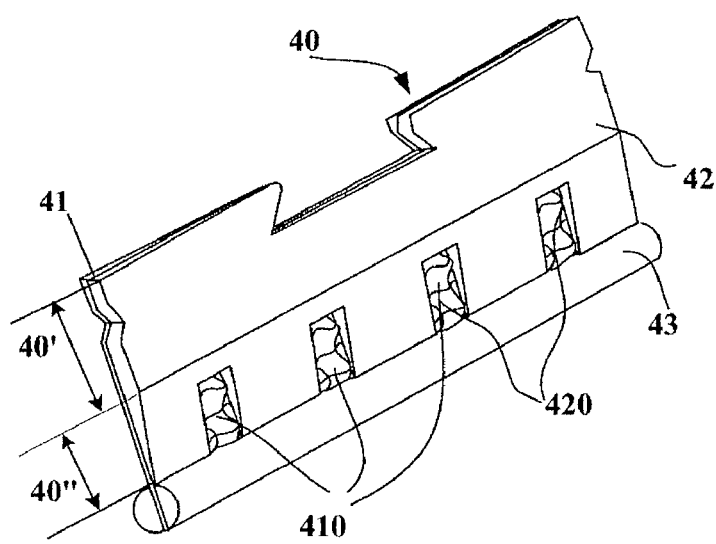
FIGS. 4A, 4B show views of one and the same blade intended for molding a sipe according to the invention in a tread.
Figure 4B:
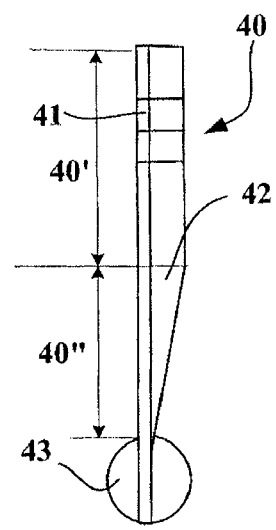

FIGS. 4A and 4B show a blade 40 for molding a sipe according to the invention. In FIG. 4A it can be seen that the blade 40 is formed of a part 40' intended to be fitted in a mould and, in the continuation of this part 40', by a part 40" intended to mould a sipe in a tread while this tread is being molded and cured.

Furthermore, the part intended to mould a sipe ends in a widened part 43 of circular cross section. This latter widened part 43 has a maximum width greater than the maximum width of the part 40" intended to mould a sipe.

It can be seen that, on the part 40" intended to mould a sipe, there are a plurality of non-locking parts 400 and mechanical-locking parts 410, the said latter locking parts 410 occupying a total surface area of about 35% of the total wall area of the sipe-molding part 40".

In the instance depicted in FIGS. 4A and 4B, the blade 40 is formed of a flat first blade 41 of uniform thickness equal to 0.6 mm superposed with a second blade 42 that has a first part with a uniform thickness of 1.2 mm (in the part 40' of the blade) and a thickness that is uniformly variable in the part 40" of the blade 40. The minimum thickness of the blade 42 is 0.6 mm. Furthermore, the second blade 42 is provided with four rectangular orifices 420 of a width of 4 mm and a length of 5 mm (this length being measured in the depth direction). Furthermore, the first blade 41 is provided, at the positions corresponding to the four orifices in the second blade 42, with an arrangement of recesses and lumps 410 the maximum amplitude of which is equal to the maximum width of the second blade 42 of variable thickness. At these locations, the thickness is further reduced (that is to say less than 0.6 mm) by deforming the metal at the time of the pressing operation used to form the said recesses and raised portions.

FIG. 4B shows the previous blade in section outside of the locking regions. It shows the superpositions of first and second blades 41, 42 ending in the widened part 43 of circular shape (of a diameter of 3 mm).

The blade 42 provided with orifices 420 is of a cross section that decreases towards the widened part 43: its maximum thickness is 1.2 mm while its minimum thickness is 0.6 mm. As a preference, the widened part has a width of at least 1.5 times the maximum width of the sipe on the tread surface.

In application, blades 40 like those described may be positioned in a mould in such a way that the sipes formed by the said blades have main walls that make the same angle (in terms of absolute value) with a perpendicular to the tread surface or alternatively may be positioned in such a way as to obtain a main wall angle that differs from the angle formed by the wall opposite (in which latter instance, the tread pattern becomes directional).

Provision may also advantageously be made for the angle of the wall the edge of which comes into contact with the road surface first, to form an angle of 90 degrees or more with a plane tangential to the tread surface on the same edge so as to increase the contact pressure on this edge (leading edge). As a preference, this angle is greater than 90 degrees and less than 110 degrees.

The invention is not restricted to the exemplary embodiments described and depicted and various modifications can be made thereto without departing from its scope and, in particular, the angles of the main walls may be equal to zero so that the said walls then become parallel to one another.

The invention claimed is:

1. A tire tread comprising a tread surface provided with a tread pattern comprising a plurality of sipes, each sipe being delimited by two opposing main walls, each of the said walls consisting of a mean surface of which the intersection with the tread surface in the initial condition forms an edge, the mean width of each sipe measured as the mean distance between the edges formed by the opposing main walls of the said sipe on the tread surface in the initial condition is at least equal to 1.5 mm, wherein each of the main walls of these sipes form between them a non-zero mean angle α (alpha), said walls being inclined in such a way that they converge towards one another in the direction towards the inside of the tread, wherein such sipe comprises at least one locking region, each locking region of a main wall collaborating with a locking region of the wall opposite in such a way as to mechanically block relative movements of the said walls at least when the tire is in contact with a road surface, the percentage of the total surface area occupied by these locking regions to the total surface area of the wall being at least 10% and at most 60% of the total surface area of each wall in the initial condition, the mean width of the sipe in each locking region being at most 0.6 mm.

2. The tread according to claim 1 wherein at least one sipe comprises a plurality of locking regions, these regions being uniformly distributed over the entire surface of the walls of the said sipe, each locking region extending near the tread surface in the initial condition as far as the bottom of the sipe.

3. The tread according to claim 1 wherein with each locking region formed under the tread surface, the minimum distance separating each locking region from the tread surface in the initial condition is at least equal to 25% of the total depth of the sipe in which the said locking region is formed.

4. The tread according to claim 3 wherein the walls of the sipes in the locking regions have roughnesses encouraging mechanical bonding of the said regions.

5. The tread according to claim 1, wherein the mean angle α (alpha) is between 4° and 10°.

6. The tread according to claim 1 wherein at least one sipe is extended by a widened part extending over its entire length, the said widened part having a width greater than the maximum width of the sipe.

7. The tread according to claim 6 wherein each sipe comprises a part that is widened with respect to the width of the sipe on the tread surface in the new condition, this widened part having a width at least equal to 1.5 times the said width on the tread surface.

8. The tread according to claim 1 wherein the mean width of the sipe in each locking region is at most 0.1 mm.

9. A molding element having two parts, a first part, intended to be mounted in a mold for molding a tread band, having uniform thickness and a second part provided in an extension of the first part and intended to mold an incision in the tread band, this second part having a variable thickness resulting from converging sides and having an average thickness at least equal to 1.5 mm, except at least one region of reduced thickness less than 0.6 mm, wherein the percentage of total surface of all the regions of reduced thickness is at least equal to 10% and at most equal to 60% of the total surface of the second part and wherein only this at least one region of reduced thickness comprises a plurality of reliefs intended to mold blocking areas on the sidewalls of the molded incision.

\* \* \* \* \*